US010672392B2

(12) United States Patent
King et al.

(10) Patent No.: US 10,672,392 B2
(45) Date of Patent: Jun. 2, 2020

(54) DEVICE, SYSTEM AND METHOD FOR CAUSING AN OUTPUT DEVICE TO PROVIDE INFORMATION FOR VOICE COMMAND FUNCTIONALITY

(71) Applicant: MOTOROLA SOLUTIONS, INC., Chicago, IL (US)

(72) Inventors: Melanie A. King, Hollywood, FL (US); Craig F Siddoway, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 39 days.

(21) Appl. No.: 16/042,056

(22) Filed: Jul. 23, 2018

(65) Prior Publication Data

US 2020/0027447 A1   Jan. 23, 2020

(51) Int. Cl.
| | | |
|---|---|---|
| *G10L 15/22* | (2006.01) | |
| *G10L 15/26* | (2006.01) | |
| *G10L 15/18* | (2013.01) | |
| *G06F 3/16* | (2006.01) | |
| *G10L 15/06* | (2013.01) | |
| *G10L 15/187* | (2013.01) | |

(52) U.S. Cl.
CPC .......... *G10L 15/1822* (2013.01); *G06F 3/167* (2013.01); *G10L 15/063* (2013.01); *G10L 15/187* (2013.01); *G10L 15/22* (2013.01); *G10L 2015/223* (2013.01); *G10L 2015/225* (2013.01)

(58) Field of Classification Search
CPC .................. G10L 15/22; G10L 2015/223
See application file for complete search history.

(56) References Cited

U.S. PATENT DOCUMENTS

| 6,321,189 B1 | 11/2001 | Masuichi et al. |
| 9,378,740 B1 | 6/2016 | Rosen et al. |
| 9,858,038 B2 * | 1/2018 | Divay ............... G06F 3/167 |
| 2006/0004571 A1 * | 1/2006 | Ju ....................... G10L 15/06 704/243 |

(Continued)

OTHER PUBLICATIONS

Schmidt, Anna, et al., "Context-Based Recognition Network Adaptation for Improving On-Line ASR in Air Traffic Control", Dec. 7, 2014, IEEE Spoken Language Technology Workshop (SLT), pp. 13-18.

(Continued)

*Primary Examiner* — Jialong He
(74) *Attorney, Agent, or Firm* — Perry + Currier, Inc.

(57) ABSTRACT

A device, system and method for causing an output device to provide information for voice command functionality is provided. A controller determines when a received textual term, received at the controller via one or more of an input device and a communications unit, is phonetically similar to one or more existing textual terms used for activating functionality at a communication device using a voice recognition algorithm. When the received textual term, are phonetically similar to one or more existing textual terms, the controller: generates one or more suggested textual terms, related to the received textual term, that minimizes phonetic similarities with the one or more existing textual terms; and causes an output device to provide an indication of the one or more suggested textual terms to use in place of the received textual term.

18 Claims, 8 Drawing Sheets

(56) References Cited

U.S. PATENT DOCUMENTS

| | | | | |
|---|---|---|---|---|
| 2008/0133244 | A1* | 6/2008 | Bodin | G10L 15/22 |
| | | | | 704/275 |
| 2011/0144973 | A1* | 6/2011 | Bocchieri | G06F 17/289 |
| | | | | 704/2 |
| 2012/0035932 | A1* | 2/2012 | Jitkoff | G01C 21/3608 |
| | | | | 704/254 |
| 2012/0084076 | A1* | 4/2012 | Boguraev | G06F 17/2735 |
| | | | | 704/9 |
| 2013/0085754 | A1* | 4/2013 | Cohen | G06F 17/276 |
| | | | | 704/235 |
| 2013/0324095 | A1* | 12/2013 | Namm | H04W 4/10 |
| | | | | 455/416 |
| 2015/0032448 | A1 | 1/2015 | Wasserblat et al. | |
| 2015/0243283 | A1* | 8/2015 | Halash | G10L 15/19 |
| | | | | 704/246 |
| 2017/0337923 | A1 | 11/2017 | Komissarchik et al. | |
| 2019/0259382 | A1 | 8/2019 | Stogner et al. | |

OTHER PUBLICATIONS

ISA/EPO, International Search Report and Written Opinion, Sep. 24, 2019 re International Patent Application No. PCTUS2019042542.
Tattersall C Ed—Institute of Electrical and Electronics Engineers: "Exploiting text generation techniques in the provision of help", Proceedings of the Conference on Artificial Intelligence Applications. Miami Beach, Feb. 24-28, 1991; [Proceedings of the Conference on Artificial Intelligence Applications], New York, IEEE, US, vol. i, Feb. 24, 1991 (Feb. 24, 1991), pp. 443-449, ISBN: 978-0-08186-2135-2 abstract; figures 1-2, columns 1-5.

* cited by examiner

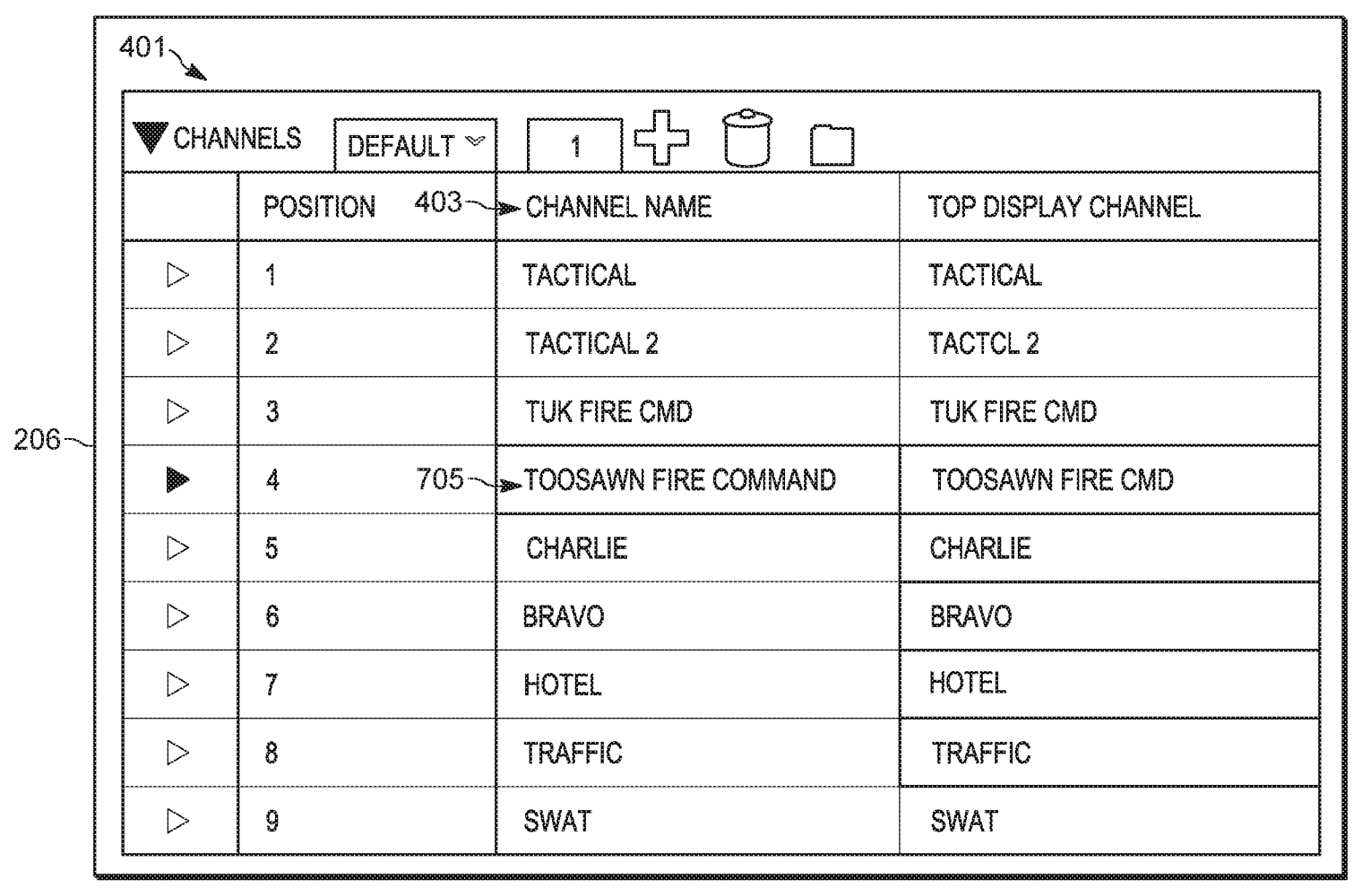

| CHANNELS | DEFAULT ⌄ | | |
|---|---|---|---|
| | POSITION | 403 → CHANNEL NAME | TOP DISPLAY CHANNEL |
| △ | 1 | TACTICAL | TACTICAL |
| △ | 2 | TACTICAL 2 | TACTCL 2 |
| △ | 3 | TUK FIRE CMD | TUK FIRE CMD |
| ▲ | 4 | 705 → TOOSAWN FIRE COMMAND | TOOSAWN FIRE CMD |
| △ | 5 | CHARLIE | CHARLIE |
| △ | 6 | BRAVO | BRAVO |
| △ | 7 | HOTEL | HOTEL |
| △ | 8 | TRAFFIC | TRAFFIC |
| △ | 9 | SWAT | SWAT |

FIG. 7

DEVICE, SYSTEM AND METHOD FOR CAUSING AN OUTPUT DEVICE TO PROVIDE INFORMATION FOR VOICE COMMAND FUNCTIONALITY

BACKGROUND OF THE INVENTION

Voice command functionality at devices is becoming ubiquitous. However, when similar phrases are used to cause different functions to be activated, a voice recognition engine may return an incorrect command and/or activate an incorrect function.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 depicts acceptance of one of the one or more suggested textual terms to use in place of the received textual term and association with a given voice command functionality in accordance with some embodiments.

Figure 1:
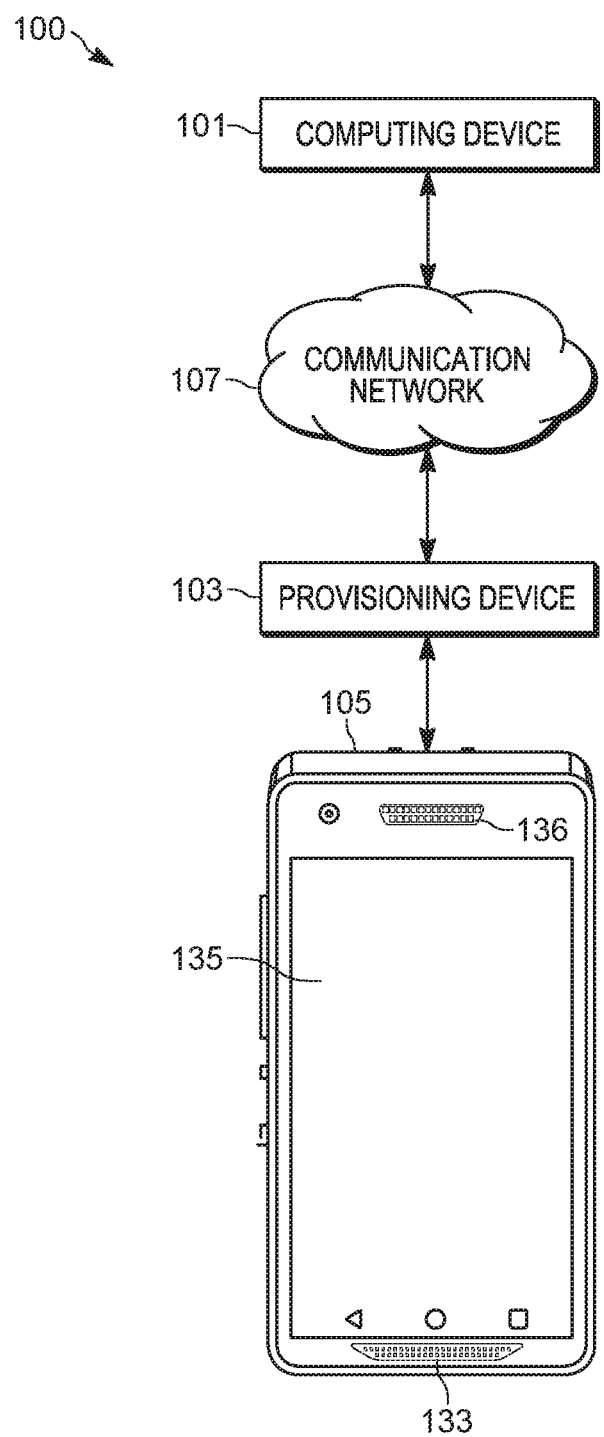
FIG. 1 depicts a system for causing an output device to provide information for voice command functionality in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: one or more of an input device and a communications unit; and a controller communicatively coupled to one or more of the input device and the communications unit, the controller configured to: when a received textual term, received via one or more of the input device and the communications unit, is phonetically similar to one or more existing textual terms used for activating functionality at a communication device using a voice recognition algorithm: generate one or more suggested textual terms, related to the received textual term, that minimizes phonetic similarities with the one or more existing textual terms; and cause an output device to provide an indication of the one or more suggested textual terms to use in place of the received textual term.

Another aspect of the specification provides a method comprising: determining, at a controller, whether a received textual term, received via one or more of an input device and a communications unit, is phonetically similar to one or more existing textual terms used for activating functionality at a communication device using a voice recognition algorithm; and, when the received textual term is phonetically similar to one or more existing textual terms: generating, at the controller, one or more suggested textual terms, related to the received textual term, that minimizes phonetic similarities with the one or more existing textual terms; and causing, using the controller, an output device to provide an indication of the one or more suggested textual terms to use in place of the received textual term.

Attention is directed to FIG. 1, which depicts a system 100 for causing an output device to provide information for voice command functionality. The system 100 comprises a computing device 101, a provisioning device 103 and a communication device 105. As depicted, the provisioning device 103 is configured to communicate with the computing device 101 via a communication network 107 (interchangeably referred to hereafter as the network 107), and further configured to communicate with the communication device 105, using respective wired and/or wireless communication links. The provisioning device 103 is generally configured to provision the communication device 105, as described in further detail below. Communication links are depicted in system 100 as arrows between the components of the system 100 and the network 107. As depicted, the provisioning device 103 may be local to the communication device 105, however in other examples, the provisioning device 103 and the communication device 105 may also be in communication via the network 107.

The computing device 101, may comprise one or more cloud computing devices and/or servers, and may be operated by a public service and/or emergency service entity, such as a police service entity, a fire service entity, an emergency medical service entity, and the like. However, the computing device 101 may be operated by another type of entity including, but not limited to, a commercial entity and/or business entity. In some examples, the computing device 101 may be optional.

The provisioning device 103, may comprise a computing device, including, but not limited to, a personal computer, a laptop computer, and the like. The provisioning device 103 may be generally configured to provision the communication device 105, for example to provision the communication device 105 at the beginning of a shift when the communication device 105 is checked out of a storage area by a user and the like. Alternatively, and/or in addition to provisioning the communication device 105 for shifts, the provisioning device 103 may be used to provision channels and/or talkgroups at the communication device 105. However, in other examples, the computing device 101 may be configured to provision the communication device 105 and/or the communication device 105 may be configured to provision itself; in these examples, provisioning device 103 may be optional. However, present examples are described with reference to the provisioning device 103 provisioning channels and/or talkgroups at the communication device 105.

The communication device 105 may generally comprise a radio and/or mobile device used by first responders, and the like, and may be generally configured to communicate using channels and/or talkgroups, and the like. However, other types of communication devices are within the scope of the present specification including, but not limited to, commercial and/or business-related communication devices. Regardless, the communication device 105 is generally configured for voice command functionality.

For example, the communication device 105 generally comprises a microphone 133, and given functions of the communication device 105 may be activated upon receipt of voice at the microphone 133 that includes a voice command, the voice commands recognized using a voice recognition algorithm at the communication device 105.

In some examples, the communication device 105 comprise a radio, and voice command functionality may include, but are not limited to, activating one or more channels and/or talkgroups upon receipt of a name of the channel and/or talkgroup at the microphone 133 (e.g. the channel and/or talkgroup name may comprise a command for activating the associated channel and/or talkgroup). Such voice command functionality may be particularly pertinent in communication devices and/or radios used by public service personnel and/or first responders, such as police, fire fighters, emergency medical technicians and the like. For example, in emergency situations, a first responder may be attempting to rapidly initiate communications with other first responders and may be using voice recognition at the communication device 105 to quickly establish such communications by speaking a name of a channel and/or a talkgroup into the microphone 133. When names of channels and/or talkgroups are similar, an unintended channel and/or talkgroup may be activated which may lead to confusion and/or poor communications in such emergency situations. Such confusion and/or poor communications may lead to a worsening of an emergency situation and/or result in a waste of processing resources, radio resources and/or bandwidth resources at the communication device 105 and/or in a communication network and/or at other communication devices receiving unintended communications.

Hence, one or more of the computing device 101, the provisioning device 103 and the communication device 105 is generally configured to cause an output device to provide information for voice command functionality, for example during a provisioning process; in particular, as described in more detail below, the information for voice command functionality may include providing alternative suggestions for channel and/or talkgroup names, when a received channel and/or talkgroup name is phonetically similar to one or more existing channel and/or talkgroup names.

However, while in examples provided herein, voice command functionality is described with respect to channel and/or talkgroup names of radios, techniques for causing an output device to provide information for voice command functionality as described herein may include any type of voice command functionality at any type of device that uses voice command functionality.

Furthermore, alternative suggestions for voice command functionality may be provided at an output device of the communication device 105, such as a display screen 135 and/or a speaker 136; however, when the provisioning device 103 is being used to provision the communication device 105, the alternative suggestions may be provided at a display screen and/or speaker (not depicted) of the provisioning device 103.

Figure 2:
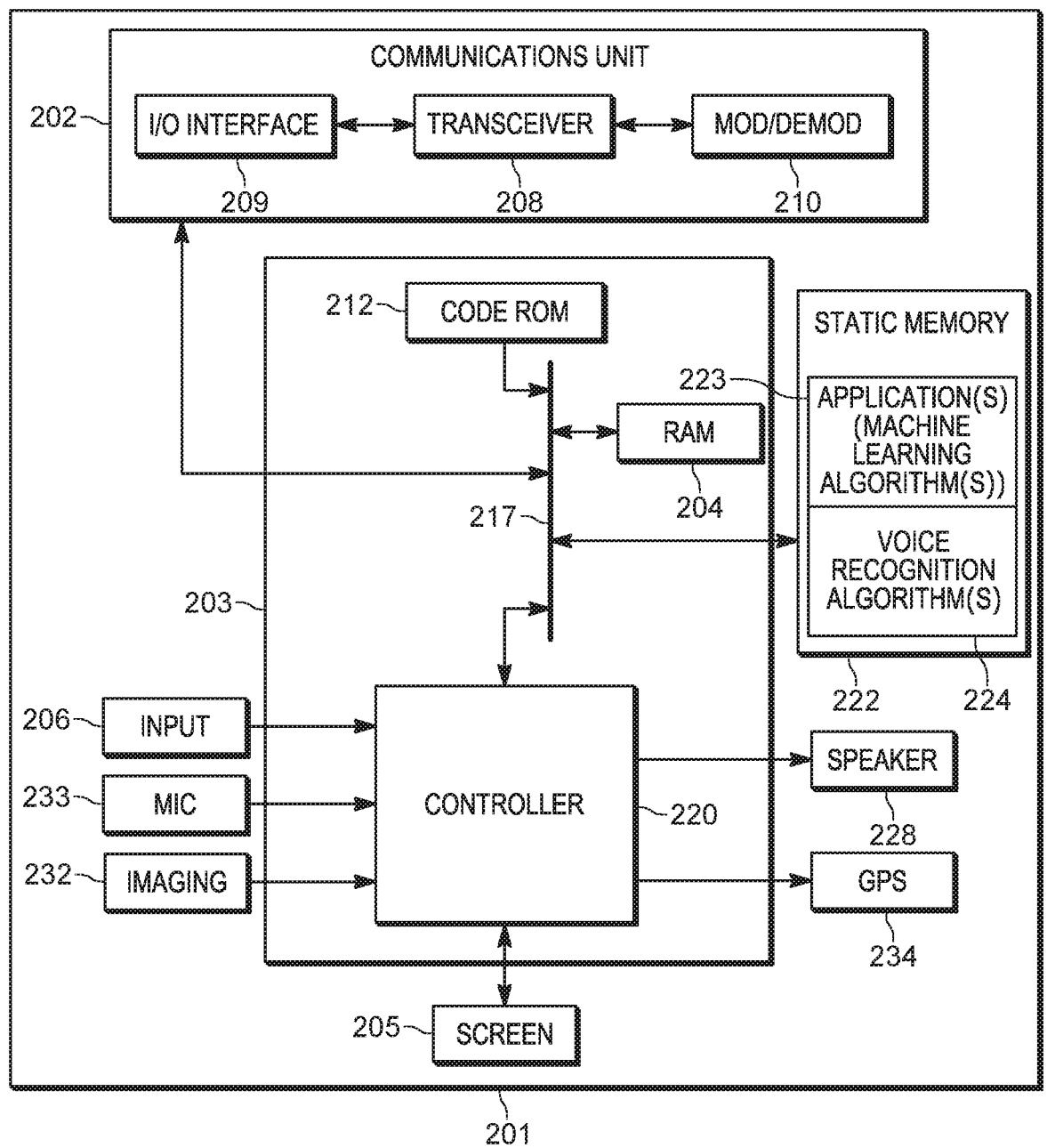
FIG. 2 depicts an example device for causing an output device to provide information for voice command functionality in accordance with some embodiments.

Attention is next directed to FIG. 2 which sets forth a schematic diagram that illustrates an example of a communication and/or computing device 201, interchangeably referred to hereafter as the device 201 and/or the example device 201. One or more of the devices 101, 103, 105 may have a configuration similar to the example device 201. However, while the example device 201 is described with respect to including certain components, it is understood that the example device 201 may be configured according to the functionality of a specific device and the configuration of the example device 201 may be adapted for a particular respective configuration of the devices 101, 103, 105. For example, the computing device 101 may not include input devices and/or output devices (such as a display screen, speakers, microphones, keyboards and the like) and/or a Global Positioning (GPS) unit, and the provisioning device 103 may not include a GPS unit; other variations and configurations of the example device 201 adapted for functionality of one or more of the devices 101, 103, 105 are within the scope of the present specification.

As depicted in FIG. 2, the example device 201 generally includes a communications unit 202, a processing unit 203, a Random Access Memory (RAM) 204, a display screen 205, an input device 206, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing one or more applications 223 (which may include one or more machine learning algorithms) and one or more voice recognition algorithms 224, a speaker 228, an imaging device 232, a microphone 233 and a GPS unit 234. The one or more applications 223 will be interchangeably referred to hereafter as the application 223, though different applications 223 may be used for different modes of the example device 201, as described in further detail below. The one or more voice recognition algorithms 224 will be interchangeably referred to hereafter as the voice recognition algorithm 224, though different or more voice recognition algorithms 224 may be used for different modes of the example device 201; furthermore, the voice recognition algorithm 224 may be present when the example device 201 includes the communication device 105, however, the voice recognition algorithm 224 may not be present when the example device 201 includes the computing device 101 and/or the provisioning device 103. The voice recognition algorithm 224 includes any suitable voice recognition algorithm for recognizing given words in voice received at the microphone 233 (and/or at the microphone 133).

The example device 201 is described hereafter in further detail. As shown in FIG. 2, the example device 201 includes the communications unit 202 coupled to the common data and address bus 217 of the processing unit 203. The example device 201 may also include the one or more input devices 206 (e.g., keypad, pointing device, touch-sensitive surface, etc.) and the display screen 205 (which, in some examples, may be a touch screen and thus also act as an input device 206), each coupled to be in communication with the processing unit 203.

The speaker 228 may be present for reproducing audio that is decoded from voice or audio streams of calls received via the communications unit 202 for example to provide navigation instructions.

Furthermore, when the example device 201 is embodied as the communication device 105, the display screen 205 and/or the speaker 228 may be caused to provide an indication of one or more suggested textual terms to use in place of a received textual term as described in more detail below.

The imaging device 232 is generally optional and, when present, may provide video (still or moving images) of an area in a field of view of the example device 201 for further processing by the processing unit 203 and/or for further transmission by the communications unit 202.

The microphone 233 is generally configured for capturing audio from a user and/or other environmental or background audio that may be further processed by the processing unit 203 and/or is transmitted as voice or audio stream data, or as acoustical environment indications, by the communications unit 202. Furthermore, when the example device 201 is embodied as the communication device 105, the microphone 233 may capture voice commands to activate functionality of the communication device 105.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other devices.

For example, the communications unit 202 may include one or more wireless transceivers 208, such as a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE transceiver, a Worldwide Interoperability for Microwave Access (WiMAX) transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to the display screen 205, the input device 206, the imaging device 232, the speaker 228 and/or the microphone 233.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the example device 201 is not a generic controller and/or a generic device, but a device specifically configured to implement functionality for causing an output device to provide information for voice command functionality. For example, in some examples, the controller 220 and/or the example device 201 specifically comprises a computer executable engine configured to implement specific functionality for causing an output device to provide information for voice command functionality.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the example device 201 as described herein are maintained, persistently, at the memory 222 and used by the controller 220 which makes appropriate utilization of volatile storage during the execution of such programming instructions.

In particular, the memory 222 stores instructions corresponding to the application 223 that, when executed by the controller 220, enables the controller 220 to implement functionality for causing an output device to provide information for voice command functionality. In illustrated examples, when the controller 220 executes the application 223, the controller 220 is enabled to: when a received textual term, received via one or more of the input device 206 and the communications unit 202, is phonetically similar to one or more existing textual terms used for activating functionality at a communication device (e.g. the communication device 105) using a voice recognition algorithm (e.g. the voice recognition algorithm 224): generate one or more suggested textual terms, related to the received textual term, that minimizes phonetic similarities with the one or more existing textual terms; and cause an output device to provide an indication of the one or more suggested textual terms to use in place of the received textual term.

The application 223 may include one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm is within the scope of present implementations.

Furthermore, the application 223 may include one or more confusability algorithms; such confusability algorithms may comprise one or more algorithms configured to determine when two terms are phonetically similar to each other. Hence, the controller 220 may be further configured to determine whether the received textual term is phonetically similar to the one or more existing textual terms using one or more of: at least one confusability algorithm; at least one algorithm configured to determine when two textual terms are phonetically similar to each other; and at least one machine learning algorithm.

Furthermore, different applications 223 may correspond to different machine learning algorithms, and/or different modes of the example device 201. For example, different combinations of one or more different machine learning algorithms may be executed depending on a preconfigured and/or selected mode of the example device 201.

Furthermore, the functionality of the system 100 and/or the example device 201 may be distributed among a plurality of devices of the system 100 including, but not limited to, one or more of the devices 101, 103, 105 and/or any other cloud based device of the system 100.

Figure 3:
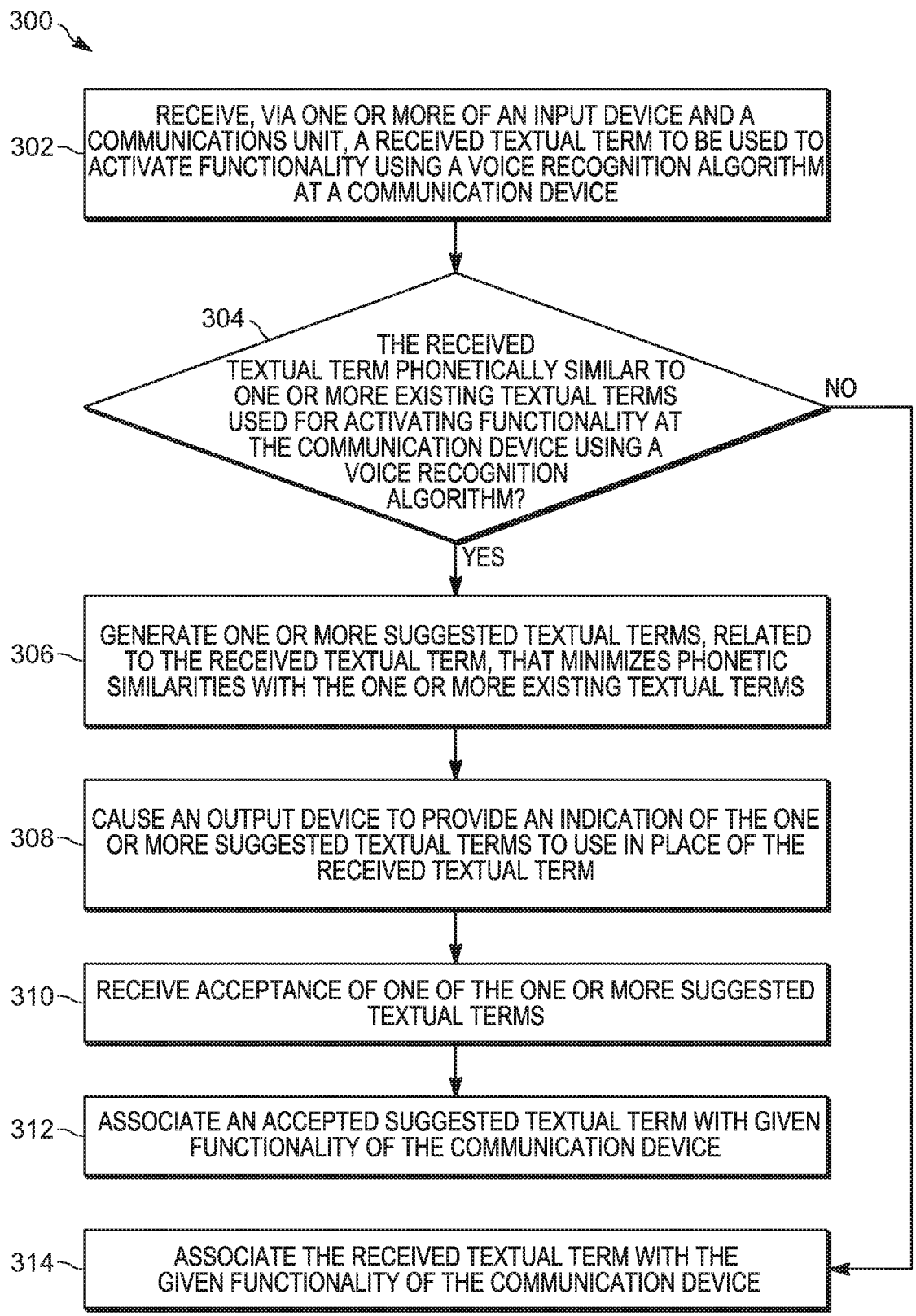
FIG. 3 depicts a flowchart of a method for causing an output device to provide information for voice command functionality in accordance with some embodiments.

Attention is now directed to FIG. 3 which depicts a flowchart representative of a method 300 for causing an output device to provide information for voice command functionality. The operations of the method 300 of FIG. 3 correspond to machine readable instructions that are executed by, for example, the example computing device 201, and specifically by the controller 220 of the example computing device 201. In the illustrated example, the instructions represented by the blocks of FIG. 3 are stored at the memory 222 for example, as the application 223. The method 300 of FIG. 3 is one way in which the controller 220 and/or the example computing device 201 and/or the system 100 is configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while it is understood by a person of skill in the art hereafter that the method 300 is described hereafter as being performed at the example device 201, the method 300 may be performed at one or more of the devices of the system 100, for example at a combination of one or more of the devices 101, 103, 105. Indeed, in an example use case, the provisioning device 103 may be configuring the communication device 101, and hence, the device 201 may be embodied as the provisioning device 103, the method 300 being performed at the provisioning device 103 to provision voice commands for activating channels at the communication device 105.

At a block 302, the controller 220 of the example device 201 receives, a textual term (e.g. a received textual term) via one or more of an input device and a communications unit. Any type of textual term is within the scope of present examples, including alphanumeric textual terms and/or any other suitable type of textual term. The received textual term may be received at the input device 206, for example via a user of the example device 201 typing at a keyboard, and the like, of the example device 201; however, the received textual term may be received at an input device of another device and transmitted to the example device 201, the received textual term being received via the communications unit 202.

For example, when the method 300 is being implemented at the example device 201 and/or the provisioning device 103, the received textual term may be received via an input device of the communications device 105 and transmitted to the example device 201 and/or the provisioning device 103. For example, the display screen 135 may include a touch screen that may be used to input text at the communication device 105. In particular, in some examples, a user of the communications device 105 may be attempting to generate a command to be used to voice activate given functionality at the communication device 105 (e.g. to automatically initiate radio communications on a given channel), and operate an input device of the communications device 105 to input a channel name (e.g. the received textual term). Hence a textual term received at the block 302 may comprise input corresponding to typed textual input; however, the textual term received at the block 302 may comprises textual terms received via a microphone (e.g. the microphone 233) and converted to text using a speech-to-text engine, and the like.

At a block 304, the controller 220 of the example device 201 determines whether the received textual term is phonetically similar to one or more existing textual terms used for activating functionality at a communication device (e.g. the communication device 105) using a voice recognition algorithm (e.g. the voice recognition algorithm 224). As described above, the controller 220 may be further configured to determine whether the received textual term is phonetically similar to the one or more existing textual terms using one or more of: at least one confusability algorithm; at least one algorithm configured to determine when two textual terms are phonetically similar to each other; and at least one machine learning algorithm. Indeed, other types of algorithms for determining whether textual terms are phonetically similar are within the scope of the present specification. For example, such algorithms may use similarity threshold levels and/or ranges of consonants, vowel sounds, sound patterns, and the like, to determine whether textual terms are phonetically similar. For example, the terms "TUK" and "TUC" may be determined to be phonetically similar as the "k" sound in "TUK" and the hard "c" sound in "TUC" are within a similarity threshold level. However, the terms "TUK" and "TOOSAWN" may be determined not to be phonetically similar as: the "k" sound in "TUK" and the sibilant "s" sound in "TOOSAWN" are not within a similarity threshold level; and as "TOOSAWN" has two syllables and "TUK" has one syllable. Hence such algorithms may determine that the terms "TUK" and "TOOSAWN" have different consonants sounds and different sound patterns and such algorithms may determine the terms are not phonetically similar.

When a received textual term is phonetically similar to one or more existing textual terms used for activating functionality at a communication device using a voice recognition algorithm (e.g. a "YES" decision at the block 304), at a block 306, the controller 220 of the example device 201 generates one or more suggested textual terms, related to the received textual term, that minimizes phonetic similarities with the one or more existing textual terms.

Generation of the one or more suggested textual terms may occur according to various modes and/or in various orders.

For example, in some examples and/or modes, the controller 220 may be further configured to generate the one or more suggested textual terms by one or more of: using geographic names related to the received textual term; using a location of an entity related to the device to prioritize the geographic names; expanding an abbreviation in the received textual term; expanding an acronym in the received textual term; expanding a public-safety-related acronym in received textual term; and generating a textual representation of a phonetic representation of a name indicated in the received textual term.

When expanding acronyms and/or abbreviations, expansions of public safety acronyms may be prioritized, for example when more than one acronym and/or abbreviation is in a received textual term. For example, the acronym and/or abbreviation "CMD", in a term "TUC Fire CMD" received as input at the block 302 to name a channel, may be expanded to "TUC Fire Command" as a suggested textual term. As the term "CMD" is a public safety acronym and/or abbreviation, "CMD" is expanded before the abbreviation "TUC", which stands for "Tucson" (e.g. Tucson, Ariz.). In some examples, after expanding an acronym and/or abbreviation, the controller 220 determines whether the expanded acronym and/or abbreviation minimizes phonetic similarities with the one or more existing textual terms, as described above; when the phonetic similarities are not minimized the expanded acronym and/or abbreviation may be discarded.

Similarly, geographic names related to a received textual term may be used as a suggested textual term. For example, for a term "TUC Fire CMD" received as input at the block 302 to name a channel, a suggested textual term of "Tucson Fire Command" may be generated, when the controller 220 has access to a geographic location (e.g. "Tucson, Ariz.") associated with channel names being received.

Similarly, a location of an entity related to the example device 201 (e.g. and/or the communication device 105) may be used to prioritize the geographic names. For example, for a term "Fire CMD" received as input at the block 302 to name a channel, a suggested textual term of "Tucson Fire Command" and "Arizona Fire Command" may be generated; however, when the example device 201 (e.g. and/or the communication device 105) is associated with the Tucson Fire Command, the location "Tucson" may be prioritized over the more general location "Arizona".

In yet further examples, the controller 220 may generate a textual representation of a phonetic representation of a name indicated in the received textual term. For example, for a term "Tucson Fire Command" received as input at the block 302 to name a channel, a suggested textual term of "Toosawn Fire Command" as the term "Toosawn" is similar to how the name "Tucson" is pronounced (e.g. as compared to how the name "Tucson" is spelled).

In other examples and/or modes, the controller 220 may be further configured to generate the one or more suggested textual terms by: when the one or more existing textual terms are from a first given list of textual terms, retrieving the one or more suggested textual terms from a second given list of textual terms; and when the one or more existing textual terms comprise channel names of a first zone, retrieving the one or more suggested textual terms from respective channel names of a second zone. For example, when the communication device 105 comprises a radio configured to communicate via channels the channels may be divided into zones and/or groups of channels. In general, in these examples, the communication device 105 may communicate over channels in zones, but only using one zone at a time (e.g. zones may be selected using an input device at the communication device 105). Hence, the channels in each zone may have names which may be the same or different as channel names of other zones. Hence, when the received textual term (e.g. received at the block 302) is to name a channel in a first zone, and the received textual term is phonetically similar to an existing channel name in the first zone, the controller 220 may retrieve the one or more suggested textual terms from respective channel names of a second zone; the one or more suggested textual terms may hence be the same as one or more of the respective channel names of the second zone.

Similarly, when the received textual term (e.g. received at the block 302) is phonetically similar to an existing textual term from a first given list of textual terms, for example which may be used as commands for activating functionality at a communication device using a voice recognition algorithm in a first mode, the controller 220 may retrieve the one or more suggested textual terms from a second given list of textual terms, for example which may be used as commands for activating functionality at a communication device using a voice recognition algorithm in a second mode.

In yet further examples and/or modes, the controller 220 may be further configured to generate the one or more suggested textual terms by: retrieving the one or more suggested textual terms from a list of previously used textual terms no longer in use for activating the functionality at a communication device using the voice recognition algorithm. For example, a given textual term may have been used historically to activate functionality at the communication device 105 and/or may have been used to name a channel and/or talkgroup at the communication device 105, but may no longer be in use. A list of such previously used textual terms and/or channel names and/or talkgroup names that are no longer in use may be maintained at a memory of the system 100 and/or the memory 222, and the controller 220 may retrieve the one or more suggested textual terms from such a list.

Similarly, a cloud based device of the system 100 may maintain one or more lists of textual terms, for example a list of textual terms maintained and/or compiled by an entity with which the system 100 is associated; and the controller 220 may retrieve the one or more suggested textual terms from such a cloud based device. For example, when the example device 201 is embodied as the provisioning device 103 and/or the communication device 105, the computing device 101 may maintain one or more lists of textual terms and the provisioning device 103 and/or the communication device 105 may retrieve the one or more suggested textual terms form the computing device 101.

In yet further examples, the controller 220 may generate the one or more suggested textual terms by one or more of prepending and appending one or more additional textual terms to the received textual term. For example, a numerical order word such "first", "second", and the like, may prepended to the received textual term and/or a number "1", "2", and the like, may be appended to the received textual term. However, any suitable type of additional textual terms may be prepended and/or appended to the received textual term.

Hence, the controller 220 may generate the one or more suggested textual terms according to various modes, and each of the modes may be implemented using the same application 223 and/or different applications 223.

Furthermore, the modes may be implemented in a given order. For example, in a first mode, the controller 220 may generate a suggested textual term by expanding an abbreviation. The controller 220 may determine whether the suggested textual term with the expanded abbreviation is phonetically similar to existing textual terms; if so, in a second mode, the controller 220 may then retrieve a suggested term from a second list and/or a list of channel names of a second zone, as described above. The controller 220 may determine whether the suggested textual term retrieved from the second list is phonetically similar to existing textual terms (e.g. in a first list); if so, in a third mode, the controller 220 may then retrieve a suggested term from list of previously used textual terms, as described above. In each of the modes, when a suggested textual term is not phonetically similar to existing textual terms, the suggested textual term may be accepted and associated with given functionality of the computing device, as described hereafter.

At a block 308, the controller 220 of the example device 201 causes an output device to provide an indication of the one or more suggested textual terms to use in place of the received textual term. For example, the display screen 205 may be controlled to respectively output a visual indication of the one or more suggested textual terms and/or the speaker 228 may be controlled to respectively output an aural indication of the one or more suggested textual terms. For example, when the example device 201 is embodied the provisioning device 103, a display screen and/or a speaker of the provisioning device 103 may be controlled to respectively output an indication of the one or more suggested textual terms. Similarly, when the example device 201 is embodied the communication device 105, the display screen 135 and/or a speaker of the communication device 105 may be controlled to respectively output an indication of the one or more suggested textual terms.

Alternatively, when the example device 201 is embodied as one or more of the computing device 101 and the provisioning device 103, the controller 220 may cause an output device at the communication device 105 to provide an indication of the one or more suggested textual terms to use in place of the received textual term. For example, one or more of the computing device 101 and the provisioning device 103 may receive a received textual term from the communication device 105, and generate the one or more suggested textual terms as described above. The one or more of the computing device 101 and the provisioning device 103 may cause an output device of the communication device 105 to provide an indication of the one or more suggested textual terms by transmitting the one or more suggested textual terms to the communication device 105. The communication device 105 may then output the one or more suggested textual terms at the display screen 135 and/or the speaker 136.

Regardless, the one or more suggested textual terms may be output at an output device as suggestions to use in place of the received textual term. In some examples, when one suggested textual term is generated, the one suggested textual term may be automatically associated with given functionality of the communication device 105 (e.g. for automatic initiation of communications on a given channel) such that when the voice recognition algorithm 224 recognizes the one suggested textual term in voice received at the microphone 133 of the communication device 105, the given functionality is implemented at the communication device 105. For example, when the one suggested textual term is received at the microphone 133, the communication device 105 may automatically initiate communications on the channel having the name of the one suggested textual term.

However, in other examples, at the block 310, the controller 220 of the example device 201 may receive (e.g. via one or more of the input device 206 and the communications unit 202), an acceptance of one of the one or more suggested textual terms. In some examples where one suggested textual term is generated, the example device 201 may request a manual acceptance of the one suggested textual term. In examples where more than one suggested textual term is generated, the example device 201 may request a manual selection of one of the suggested textual terms as part of the acceptance at the block 310. Such a manual acceptance (and/or selection) may occur using a user interface at the example device 201 and/or the communication device 105.

In some examples, once a suggested textual term is accepted, at a block 312 the controller 220 of the example device 201 associates the accepted suggested textual term with the given functionality of the communication device 105. In some examples, the block 312 occurs after the manual acceptance (and/or selection) at the block 310. However, in other examples, the block 310 is optional and/or the acceptance of a suggested term occurs automatically, and the block 312 occurs automatically, as described above (e.g. when one suggested textual term is generated); in such examples, the block 310 and/or the block 312 may include a visual and/or aural notification of the accepted suggested textual being associated with the given functionality of the communication device 105; the visual and/or aural notification may occur at the communication device 105.

Returning briefly to the block 304, when a received textual term is not phonetically similar to one or more existing textual terms used for activating functionality at a communication device using a voice recognition algorithm (e.g. a "NO" decision at the block 304), at a block 314, the controller 220 of the example device 201 associates the received suggested textual term with the given functionality of the communication device 105. The block 314 may or may not include acceptance of the received textual term similar to acceptance of one of the one or more suggested textual terms at the block 310.

Attention is next directed to FIG. 4 to FIG. 8 which depict an example of the method 300, described with respect to voice activating of channels and/or using voice commands to initiate communication on channels.

Figure 4:
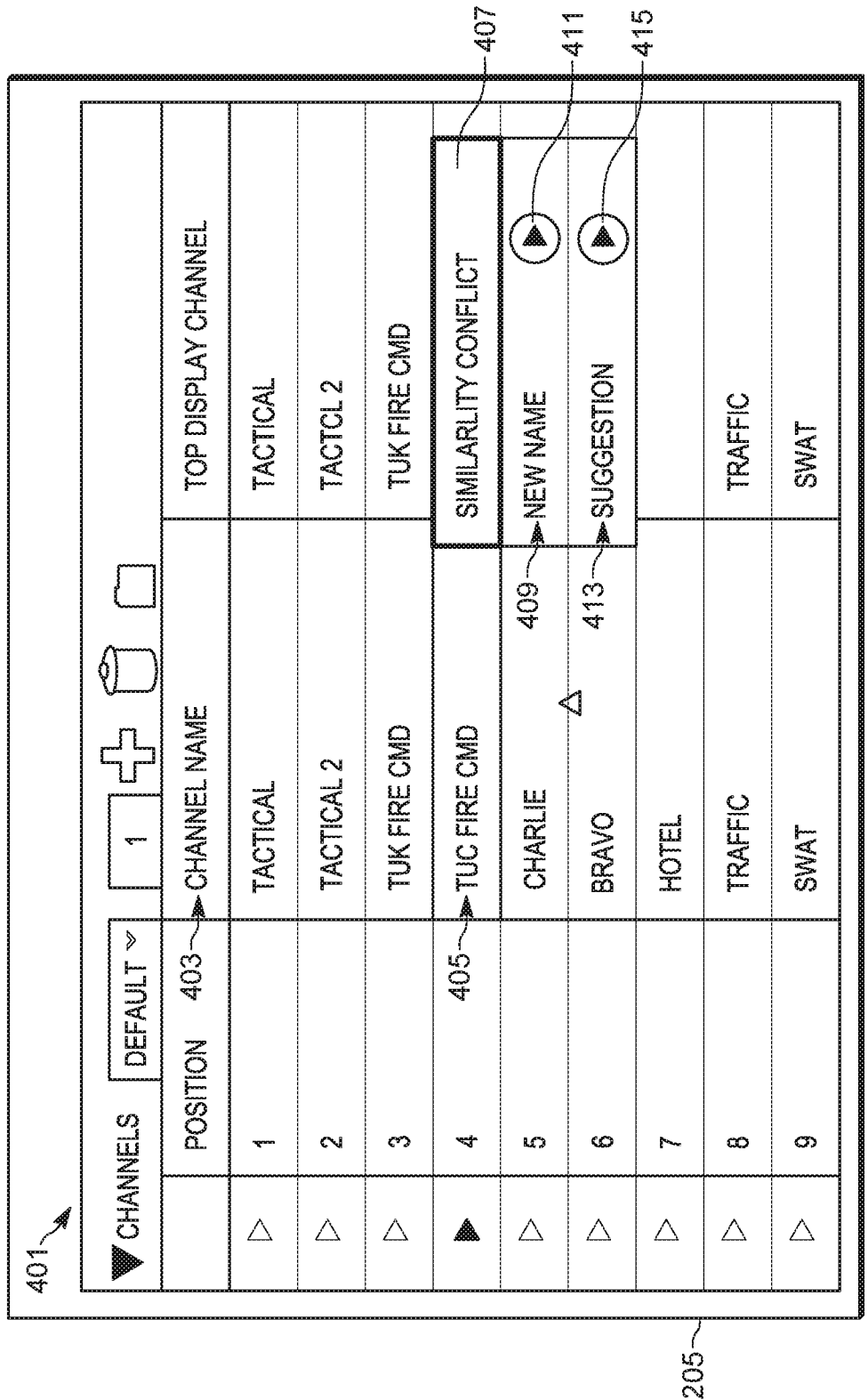
FIG. 4 depicts an example graphic user interface which may be used to input a received textual term in accordance with some embodiments.
Figure 5:
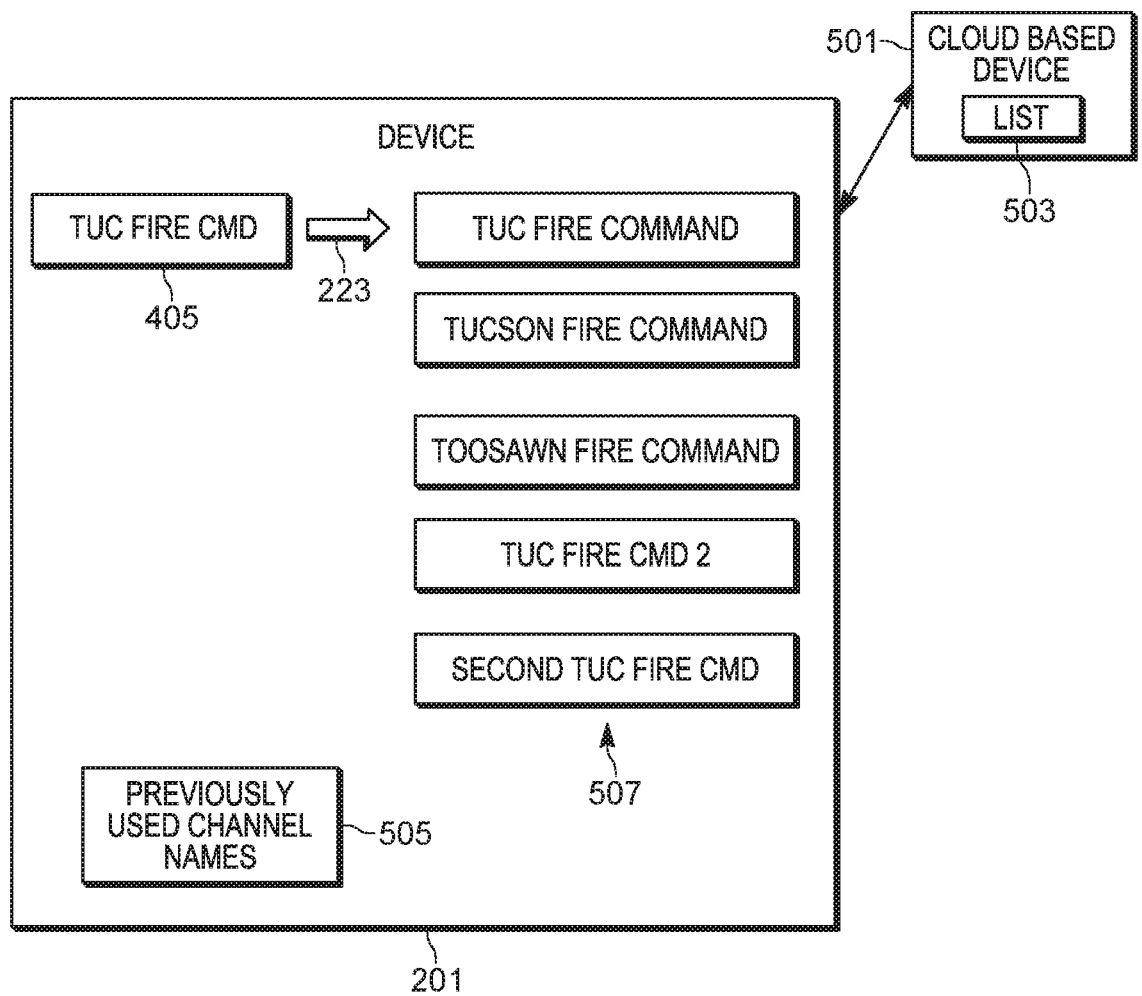
FIG. 5 depicts generation of one or more suggested textual terms, related to the received textual term, that minimizes phonetic similarities with the one or more existing textual terms in accordance with some embodiments.

FIG. 4 depicts a graphic user interface 401 that may be provided at a display screen 205 of the example device 201 (e.g. the provisioning device 103). As depicted, the graphic user interface 401 provides a list 403 of current channel names (e.g. in a column), for example for a first zone. The graphic user interface 401 may be further used to add new channel names, each of the channel names being a textual term which, when spoken by a user, may be used for activating functionality at the communication device 105 using a voice recognition algorithm, such as the voice recognition algorithm 224 and the like. For example, when a channel name is received in voice at the microphone 133, and detected using a voice recognition algorithm, communications on the corresponding channel may be automatically initiated (e.g. using a radio of the communication device 105).

As depicted, a new channel name 405 is being received (e.g. the received channel name 405), for example at a field of the list 403 which corresponds to a given channel. The received channel name 405 may be received (e.g. at the block 302 of the method 300) using an input device 206 of the example device 201, such as the provisioning device 103, for example a virtual keyboard (not depicted) and the like, for example when the display screen 205 includes a touch screen.

As depicted, the received channel name 405 is "TUC Fire CMD", which is compared (e.g. at the block 304 of the method 300) to other channel names in the list 403 (at one or more of the devices 101, 103, 105; for example, the received channel name 405 may be transmitted to one or more of the devices 101, 103). As the received channel name 405 "TUC Fire CMD" is phonetically similar to an existing channel name in the list 403, for example "TUK FIRE CMD", a second graphic user interface 407 is provided at the display screen 135 which indicates that a similarly conflict. For example, a person of skill in the art understands that the terms "TUC" and "TUK" are phonetically similar.

While optional, a selectable option 409 to enter a new name (e.g. to replace the received channel name 405 which is phonetically similar to an existing channel name) is provided in the second graphic user interface 407, along with a selectable option 411 to play the new channel name (e.g. selection of the selectable option 411 will cause the communication device 105 to play the new name at the speaker 228 (e.g. of the provisioning device 103) using, for example, a text-to-speech algorithm).

However, the second graphic user interface 407 further includes a selectable option 413 which, when selected, causes the suggested channel names to be generated (e.g. at the block 306 of the method 300. The selectable option 413 is further provided with a selectable option 415 to play a suggested channel name and selection of the selectable option 415 will cause the communication device 105 to play the new name at the speaker 228 (e.g. of the provisioning device 103) using, for example, a text-to-speech algorithm. The selectable options 411, 415 may be used to aurally compare an entered channel name with a suggested channel name. Each of the selectable options 409, 411, 413, 415 may comprise virtual buttons and the like.

When the selectable option 413 is selected, suggested channel names are generated (e.g. at the block 306 of the method 300). For example, attention is directed to FIG. 5 which depicts the example device 201 (e.g. the provisioning device 103) generating (e.g. using the application 223) suggested channel names that are related to the received channel name 405, that minimize phonetic similarities with the one or more existing channel names. While not all components of the example device 201 are depicted, they are understood to be nonetheless present.

As depicted, the example device 201 is in communication with an optional cloud based device 501 that stores an optional list 503 of channel names for a second zone. While the channel names of the list 503 are not depicted, they may be similar or different to the channels names of the list 403. However, the list 503 may alternatively be stored at the memory 222 of the example device 201. When the example device 201 comprises the provisioning device 103 (and/or the communication device 105), the cloud based device 501 may comprise the computing device 101; however, the cloud based device 501 may be any cloud based device 501 that stores the list 503 of channel names for a second zone, and the like.

As depicted, the example device 201 (e.g. the provisioning device 103) generates a list 507 of one or more suggested channel names that are related to the received channel name 405, and that minimizes phonetic similarities with the one or more existing channel names. For example, the suggested channel name "TUC FIRE Command" is generated by prioritizing expansion of the public-safety related abbreviation "CMD". The suggested channel name "Tucson FIRE Command" is generated by expanding the abbreviations "TUC and "CMD". The suggested channel name "Toosawn FIRE Command" is generated by expanding the abbreviation "CMD" and generating a textual representation of a phonetic representation of name indicated in the received channel name 405; in particular, a phonetic representation of the name "Tucson", associated with the abbreviation "TUC" generated and in particular "Toosawn". The suggested channel name "TUC FIRE Command 2" is generated by appending the number "2" to the received channel name 405. The suggested channel name "Second TUC FIRE Command" is generated by prepending the word "Second" to the received channel name 405.

Furthermore, one or more of the suggested channel names in the list 507 may be retrieved from one or more of the cloud based device 501, the list 503 and the list 505.

Indeed, the suggested channel names of the list 507 indicate that suggested textual terms that are both related to a received textual term, and that minimize phonetic similarities with one or more existing textual terms, may include but are not limited to: words that indicate information similar to information in the received textual term but expressed using words that are phonetically different from existing textual terms; addition of words to the received textual term that are phonetically different from existing textual terms; and the like.

While one or more of the suggested channel names are provided in the form of the list 507, and further while the one or more of the suggested channel names include five suggested channel names, the one or more suggested channel names may be provided in other formats and/or the one or more of the suggested channel names may include as few as one suggested channel name, fewer than five suggested channel names, and more than five suggested channel names.

Figure 6:
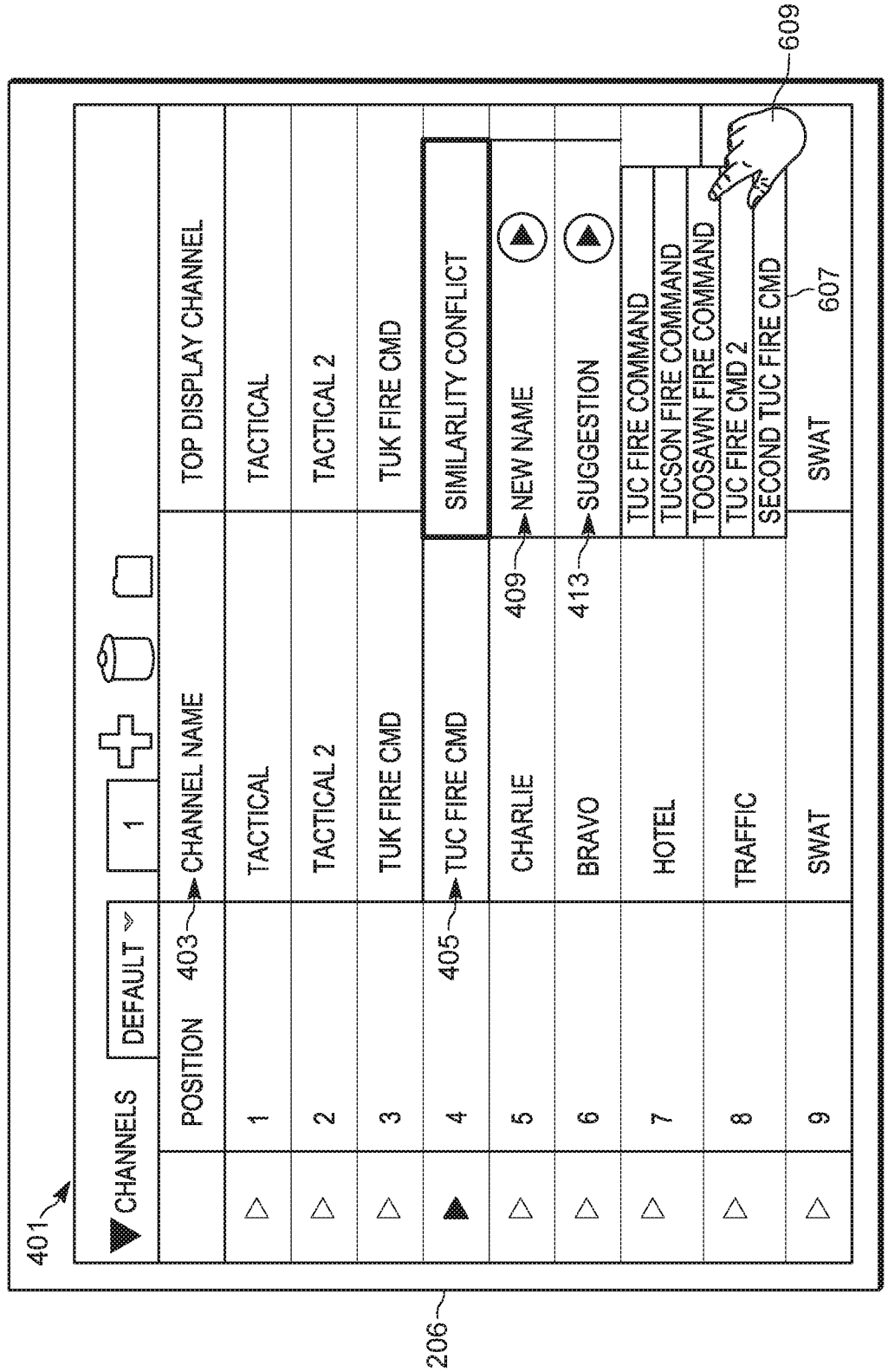
FIG. 6 depicts causing an output device to provide an indication of the one or more suggested textual terms to use in place of the received textual term in accordance with some embodiments.

Attention is next directed to FIG. 6, which is substantially similar to FIG. 4 with like elements having like numbers. However, in FIG. 6, the display screen 205 is being caused (e.g. at the block 308 of the method 300) to provide an indication 607 of the one or more of the suggested channel names in the list 507, the indication 607 comprising a plurality of selectable options each corresponding to one of the suggested channel names in the list 507.

As depicted, a hand 609 of a user is touching (e.g. at a touch screen of the display screen 205), the selectable option labelled "Toosawn Fire Command", which causes an acceptance of the suggested channel name "Toosawn Fire Command" to be received (e.g. at the block 310 of the method 300). The accepted suggested channel name is then associated (e.g. at the block 312 of the method 300) with voice command functionality for activating the channel associated with the accepted suggested channel name "Toosawn Fire Command".

For example, as depicted in FIG. 7, which is substantially similar to FIG. 4 with like elements having like numbers, an accepted suggested name 705 of "Toosawn Fire Command" is associated with a respective corresponding channel in the list 403 of channel names which, when received in voice at the microphone 133 of the communication device 105, causes voice activating of the corresponding channel. Indeed, the accepted suggested name 705 is provided in the same field of the list 403 where the received channel 405 was initially received; providing the accepted suggested name 705 in the same field of the list 403 where the received channel name 405 was initially received comprises an indication of an acceptance of the accepted suggested name 705 as well as an association of the accepted suggested name 705 with voice activating of a respective corresponding channel.

A person of skill in the art understands that when the method 300 is being implemented at the provisioning device 103 to provision the communication device 105, when the provisioning device 103 associates a channel name with a channel, data for voice activating the channel using an accepted suggested channel name may be provided (e.g. transmitted) to the communication device 105.

Figure 8:
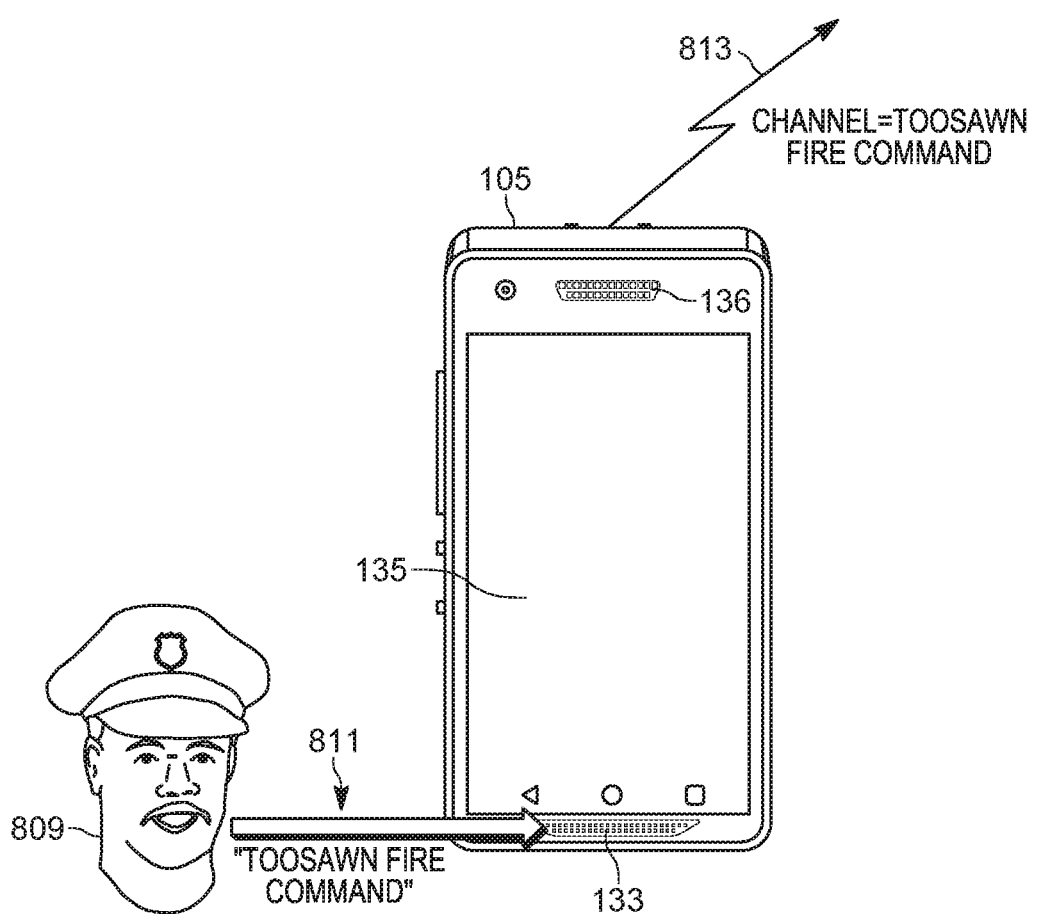
FIG. 8 depicts receipt of an accepted suggested textual terms at a microphone of a communication device and automatic implementation of associated functionality in accordance with some embodiments.

For example, attention is next directed to FIG. 8. In FIG. 8, the communication device 105 has been provisioned with an accepted suggested channel name "Toosawn Fire Command" that is associated with a respective corresponding channel. A user 809, such as a police officer, is using the communication device 105 after the accepted suggested channel name "Toosawn Fire Command" is associated with a respective corresponding channel. The user 809 may include the accepted suggested channel name 705, "Toosawn Fire Command", in voice 811 that is received at the microphone 133 of the communication device 105. In response the communication device 105 automatically implements voice command functionality associated with the accepted suggested channel name 705; in particular, the communication device 105 initiates communications 813 over the respective corresponding channel associated with the accepted suggested channel name 705, "Toosawn Fire Command" (e.g. the arrow indicated at the communications 813 indicates a signal transmitted over the respective corresponding channel associated with the accepted suggested channel name 705, "Toosawn Fire Command").

While the example of FIG. 4 to FIG. 8 has been described with respect to voice activating of channels, the method 300 may be similarly applied to voice activating of talkgroups. For example, the one or more suggested textual terms generated at the block 306 of the method 300 may comprises a name of one or more of a channel and a talkgroup to be activated when a voice recognition algorithm recognizes the one or more suggested textual terms in voice received at the microphone 133 of the communication device 105.

However, the one or more suggested terms may be for any type of voice command functionality, including, but not limited to, voice activating of one or more of: applications, messaging, telephone calls, generating and/or editing documents, and the like.

Hence, provided herein is a device, system and method for causing an output device to provide information for voice command functionality. When a received textual term is phonetically similar to one or more existing textual terms used for activating functionality at a communication device using a voice recognition algorithm, one or more suggested textual terms are generated, related to the received textual term. The one or more suggested textual terms may be generated in any suitable manner including expanding acronyms and/or abbreviations, related textual terms in lists and/or other zones, historical data, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . ." and "one or more . . ." language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   one or more of an input device and a communications unit; and
   a controller communicatively coupled to one or more of the input device and the communications unit,
   the controller configured to:
   when a received textual term, received via one or more of the input device and the communications unit, is phonetically similar to one or more existing textual terms used for activating functionality at a communication device using a voice recognition algorithm:
   generate one or more suggested textual terms that minimize phonetic similarities with the one or more existing textual terms, the one or more suggested textual terms related to the received textual term, the one or more suggested textual terms generated by retrieving, at the controller, the one or more suggested textual terms from a list of previously used textual terms no longer in use for activating the functionality at the communication device using the voice recognition algorithm; and
   cause an output device to provide an indication of the one or more suggested textual terms to use in place of the received textual term.

2. The device of claim 1, wherein the controller is further configured to generate the one or more suggested textual terms by one or more of:
   using geographic names related to the received textual term;
   using a location of an entity related to the device to prioritize the geographic names;
   expanding an abbreviation in the received textual term;
   expanding an acronym in the received textual term;
   expanding a public-safety-related acronym in received textual term; and
   generating a textual representation of a phonetic representation of a name indicated in the received textual term.

3. The device of claim 1, wherein the controller is further configured to generate the one or more suggested textual terms by:
   when the one or more existing textual terms are from a first given list of textual terms, retrieving the one or more suggested textual terms from a second given list of textual terms; and
   when the one or more existing textual terms comprise channel names of a first zone, retrieving the one or more suggested textual terms from respective channel names of a second zone.

4. The device of claim 1, wherein the controller is further configured to generate the one or more suggested textual terms by:
   retrieving the one or more suggested textual terms from a cloud based device.

5. The device of claim 1, wherein the controller is further configured to generate the one or more suggested textual terms by:
   one or more of prepending and appending one or more additional textual terms to the received textual term.

6. The device of claim 1, wherein the controller is further configured to determine whether the received textual term is phonetically similar to the one or more existing textual terms using one or more of:
   at least one confusability algorithm;
   at least one algorithm configured to determine when two textual terms are phonetically similar to each other; and
   at least one machine learning algorithm.

7. The device of claim 1, wherein the one or more suggested textual terms comprises a name of one or more of a channel and a talkgroup to be activated when the voice recognition algorithm recognizes the one or more suggested textual terms in voice received at a microphone of the communication device.

8. The device of claim 1, wherein the output device comprises one or more of a display screen and a speaker.

9. The device of claim 1, wherein the controller is further configured to:
   receive, via one or more of the input device and the communications unit, an acceptance of one of the one or more suggested textual terms; and
   associate an accepted suggested textual term with given functionality of the communication device such that when the voice recognition algorithm recognizes the accepted suggested textual term in voice received at a microphone of the communication device, the given functionality is implemented at the communication device.

10. A method comprising:
    determining, at a controller, whether a received textual term, received via one or more of an input device and a communications unit, is phonetically similar to one or more existing textual terms used for activating functionality at a communication device using a voice recognition algorithm; and,
    when the received textual term is phonetically similar to one or more existing textual terms:
    generating, at the controller, one or more suggested textual terms that minimize phonetic similarities with the one or more existing textual terms, the one or more suggested textual terms related to the received textual term, the one or more suggested textual terms generated by retrieving, at the controller, the one or more suggested textual terms from a list of previously used textual terms no longer in use for activating the functionality at the communication device using the voice recognition algorithm; and
    causing, using the controller, an output device to provide an indication of the one or more suggested textual terms to use in place of the received textual term.

11. The method of claim 10, further comprising generating the one or more suggested textual terms by one or more of:
    using geographic names related to the received textual term;
    using a location of an entity related to the communication device to prioritize the geographic names;
    expanding an abbreviation in the received textual term;
    expanding an acronym in the received textual term;
    expanding a public-safety-related acronym in received textual term; and
    generating a textual representation of a phonetic representation of a name indicated in the received textual term.

12. The method of claim 10, further comprising generating the one or more suggested textual terms by:
when the one or more existing textual terms are from a first given list of textual terms, retrieving the one or more suggested textual terms from a second given list of textual terms; and
when the one or more existing textual terms comprise channel names of a first zone, retrieving the one or more suggested textual terms from respective channel names of a second zone.

13. The method of claim 10, further comprising generating the one or more suggested textual terms by:
retrieving the one or more suggested textual terms from a cloud based device.

14. The method of claim 10, further comprising generating the one or more suggested textual terms by:
one or more of prepending and appending one or more additional textual terms to the received textual term.

15. The method of claim 10, further comprising determining whether the received textual term is phonetically similar to the one or more existing textual terms using one or more of:
at least one confusability algorithm;
at least one algorithm configured to determine when two textual terms are phonetically similar to each other; and
at least one machine learning algorithm.

16. The method of claim 10, wherein the one or more suggested textual terms comprises a name of one or more of a channel and a talkgroup to be activated when the voice recognition algorithm recognizes the one or more suggested textual terms in voice received at a microphone of the communication device.

17. The method of claim 10, wherein the output device comprises one or more of a display screen and a speaker.

18. The method of claim 10, further comprising:
receiving, at the controller, via one or more of the input device and the communications unit, an acceptance of one of the one or more suggested textual terms; and
associating, at the controller, an accepted suggested textual term with given functionality of the communication device such that when the voice recognition algorithm recognizes the accepted suggested textual term in voice received at a microphone of the communication device, the given functionality is implemented at the communication device.

* * * * *